United States Patent
Moon et al.

(10) Patent No.: US 12,512,552 B2
(45) Date of Patent: Dec. 30, 2025

(54) ENGAGEABLE ELEMENTS TO DISCONNECT BATTERIES

(71) Applicant: HEWLETT-PACKARD DEVELOPMENT COMPANY, L.P., Spring, TX (US)

(72) Inventors: Tony Seokhwa Moon, Spring, TX (US); Derek Kyle Joseph Kanas, Spring, TX (US); Michael John Bugos, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 719 days.

(21) Appl. No.: 17/897,000

(22) Filed: Aug. 26, 2022

(65) Prior Publication Data

US 2024/0072364 A1 Feb. 29, 2024

(51) Int. Cl.
*H01M 50/284* (2021.01)
*H01M 50/262* (2021.01)
*H01M 50/271* (2021.01)

(52) U.S. Cl.
CPC ....... *H01M 50/284* (2021.01); *H01M 50/262* (2021.01); *H01M 50/271* (2021.01)

(58) Field of Classification Search
CPC ............. H01M 50/284; H01M 50/262; H01M 50/271; H01M 2250/30
See application file for complete search history.

(56) References Cited

U.S. PATENT DOCUMENTS

| 8,673,481 | B2 * | 3/2014 | Chen ................ | H01M 50/216 429/96 |
| 9,324,979 | B2 * | 4/2016 | Zhao ................. | H01M 50/20 |
| 2022/0255203 | A1 * | 8/2022 | Matsuyama ........ | H01M 50/50 |

FOREIGN PATENT DOCUMENTS

| DE | 10201400131 | * | 7/2015 | ............ B62M 6/90 |
| JP | 2020-170724 | * | 10/2020 | ............ F21S 9/02 |

* cited by examiner

*Primary Examiner* — Michael L Dignan
(74) *Attorney, Agent, or Firm* — Quarles & Brady LLP

(57) ABSTRACT

An example computing device includes a housing including a battery compartment to receive a removable battery, a cover engageable with the housing to close the battery compartment, and a device connector positioned inside the housing at a fixed position relative to the housing. The device connector is to make an electrical connection with a complementary battery connector of the removable battery when the removeable battery is disposed within the battery compartment. The cover includes an engageable element to engage a complementary engageable element of the battery connector to move the battery connector to break the electrical connection with the device connector when the cover is moved to disengage from the housing.

20 Claims, 6 Drawing Sheets

ENGAGEABLE ELEMENTS TO DISCONNECT BATTERIES

BACKGROUND

Computing devices often include on-board power supplies, such as batteries. A battery may be removable from a computing device for service of the battery or computing device or replacement of the battery.

DETAILED DESCRIPTION

Servicing a computing device may involve opening the computing device and then disconnecting the battery to avoid supplying power to components that may be subject to service or that may be physically contacted during service. Leaving the battery connected during service may present a hazard to electrical components. For example, a service technician or user may accidentally create a short circuit which can damage the computing device if the battery carries a charge and remains connected.

The present disclosure provides techniques to automatically disconnect a battery of a computing device when a housing panel or cover is removed to expose the internal components of the computing device. This is useful for disconnecting power when servicing the computing device to prevent inadvertent damage to the computing device, as may occur if a service technician or user forgets to disconnect the battery. The same techniques may be applied to automatically connect the battery.

In various examples described herein, a housing panel or cover includes a protrusion (or recess) that engages with a complementary recess (or protrusion) of a battery connector. When the housing panel is moved, the battery connector moves in unison. Accordingly, the battery may be disconnected (or connected) is response to removing (or connecting) the housing panel. As such, disconnection of the battery is a mechanically enforced prerequisite to accessing the internal components of the computing device.

Figure 1A:
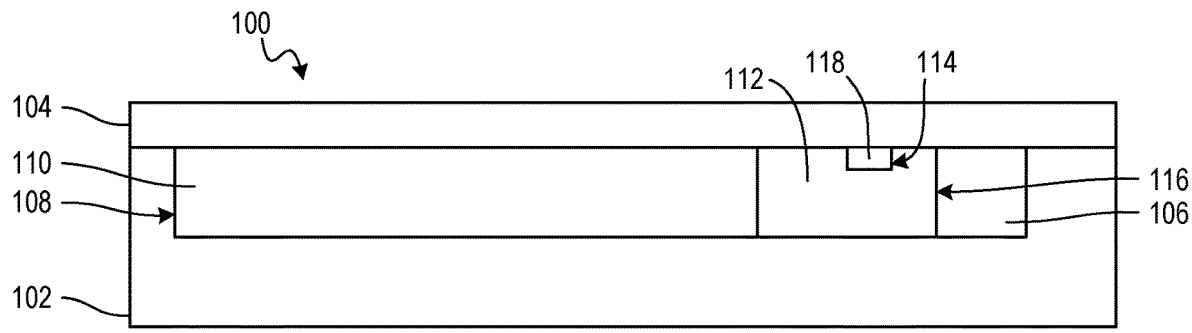
FIG. 1A is a side-view diagram of an example computing device to break an electrical connection with a battery when a cover is moved to disengage from a housing of the computing device, in which the cover is shown engaged.

FIGS. 1A to 10 show an example computing device 100 to break an electrical connection with a battery when a cover is moved to disengage from a housing of the computing device. The computing device 100 may be a notebook computer, tablet computer, smartphone, or other computing device that uses a removable battery as a power source. FIG. 1A shows the computing device with the cover engaged, FIG. 1B shows breaking the electrical connection with the cover, and FIG. 10 shows the cover opened after breaking the electrical connection.

The computing device 100 includes a housing 102, a cover 104, and a device connector 106. The computing device 100 may further include other components, such as a processor, memory, storage drive, display device, network interface, and so on.

The housing 102 includes a battery compartment 108 to receive a removable battery 110. The battery compartment 108 may be enclosed by the cover 104.

The battery 110 includes a battery connector 112. The battery connector 112 may be selectively electrically mated to the device connector 106 to make an electrical connection 116 to, for example, provide power from the battery 110 to the computing device 100. The battery connector 112 may be moveable independent of the battery 110. That is, the battery connector 112 may be free to move while the battery 110 is stationary. For example, the battery connector 112 may be connected to the battery 110 by a flexible cable.

The electrical connection 116 provide by the connectors 106, 112 may enable charging of the battery by, for example, a charging circuit of the computing device 100. The electrical connection 116 may also communicate data between the battery 110 and the computing device 100.

The battery connector 112 may be selectively mechanically mated to the device connector 106 to provide a mechanical connection that secures the electrical connection 116. The battery connector 112 includes an engageable element 114 to provide for this selective mechanical mating.

The battery connector 112 and device connector 106 may have any suitable number of conductive contacts, pins, receptables, or other structures. The battery connector 112 may be a male connector and device connector 106 may be a female connector. Alternatively, the battery connector 112 may be a female connector and device connector 106 may be a male connector.

The cover (or panel) 104 is engageable with the housing 102 to enclose the battery compartment 108. The cover 104 may be completely separable from the housing 102 or may be sufficiently movable (e.g., hinged) to expose the battery compartment 108, while remaining attached to the housing 102. The cover 104 includes a complementary engageable element 118 to engage with the engageable element 114 of the battery connector 112.

The device connector 106 is positioned inside the housing 102 at a fixed position relative to the housing 102. That is, the device connector 106 may be affixed to the housing 102 or a component within the housing 102 to be stationary within the housing 102. The device connector 106 makes the electrical connection 116 with the complementary battery connector 112 of the removable battery 110 when the removeable battery 110 is disposed within the battery compartment 108.

Figure 1B:
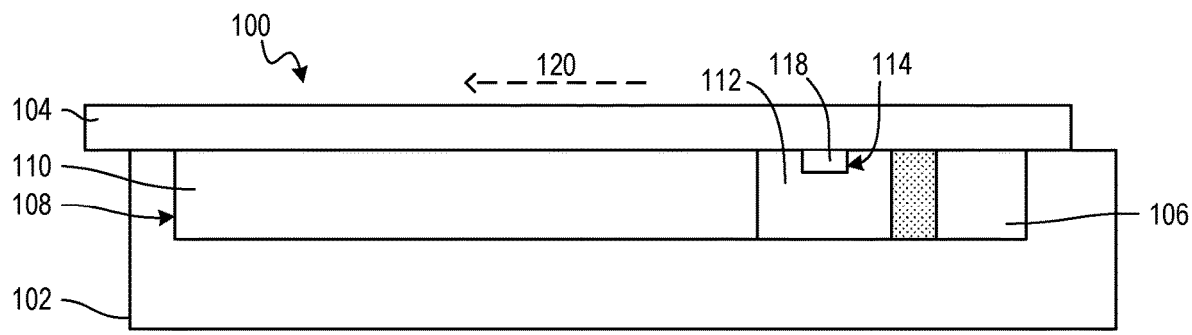
FIG. 1B is a side-view diagram of the example computing device of FIG. 1A showing the breaking the electrical connection with the cover.
Figure 1C:
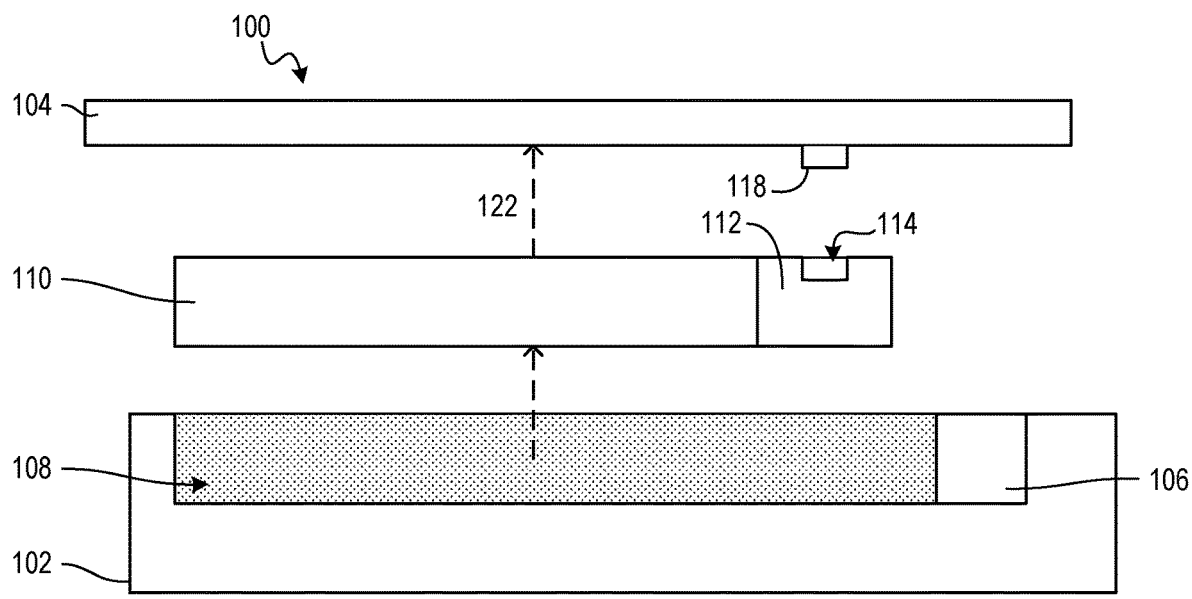
FIG. 1C is a side-view diagram of the example computing device of FIG. 1A showing the cover opened.

The engageable element 118 of the cover 104 may engage with the complementary engageable element 114 of the battery connector 112 to selectively move the battery connector 112 in unison with the cover 104, as shown by arrow 120 in FIG. 1B, for example. The engageable element 118 of the cover 104 may also disengage with the complementary engageable element 114 of the battery connector 112 to allow separation of the cover 104 and the battery connector 112, as shown by arrow 122 in FIG. 10, for example.

The engageable element 118 of the cover 104 may include a protrusion that is insertable into and removable from a recess that forms the complementary engageable element 114 of the battery connector 112, as depicted. In other examples, such as that of FIG. 2, the engageable element of the cover 104 includes a recess to receive a protrusion that forms the complementary engageable element of the battery connector 112.

The relative motion of the battery connector 112 with respect to the device connector 106 may be along an axis of connection along which the electrical connection 116 is made or broken, as shown by the arrow 120. The relative motion of the engageable elements 114, 118 to disengage and/or engage the elements 114, 118 is along an axis that is non-coincident with the axis of connection, as shown by arrow 122. For example, the protrusion 118 may be inserted and removed from the recess 114 along the axis of the arrow 122. The axis of relative motion of the engageable elements 114, 118 may be perpendicular to the axis of connection of the electrical connection 116.

"Perpendicular" as used in this disclosure is not intended to mean exactly perpendicular and may allow for some deviation, such as up to 5 degrees, up to 10 degrees, or up to 30 degrees of deviation from true perpendicular provided that the described functionality is substantially achieved.

In an example operation to break the electrical connection 116 with the battery 110, the computing device 100 starts with the battery 110 connected and the engageable elements 114, 118 engaged, as shown in FIG. 1A. The cover 104 is then moved to disengage from the housing 102, for example, by sliding the cover 104 along the housing 102 (arrow 120), as shown in FIG. 1B. The engagement of the engageable elements 114, 118 causes the battery connector 112 to move together with the cover 104 and break the electrical connection 116 between the battery connector 112 and the device connector 106. Then, the engageable elements 114, 118 may be disengaged by, for example, separating the cover 104 from the battery 110 in the perpendicular direction (arrow 122). The cover 104 and/or battery 110 may be removed from the housing 102. As can be seen, opening the cover 104 automatically breaks the electrical connection 116 with the battery 110 without additional manipulation.

In an example operation to make the electrical connection 116 with the battery 110, the computing device 100 starts with the battery 110 disconnected and the engageable elements 114, 118 disengaged, as shown in FIG. 10. The engageable elements 114, 118 may be engaged by, for example, inserting the battery 110 into the compartment 108 and moving the cover 104 to the housing (opposite arrow 122), as shown in FIG. 1B. The cover 104 is then moved to engage with the housing 102, for example, by sliding the cover 104 along the housing 102 (opposite arrow 120). The engagement of the engageable elements 114, 118 causes the battery connector 112 to move together with the cover 104 and make the electrical connection 116 between the battery connector 112 and the device connector 106, as shown in FIG. 1A.

Figure 2:
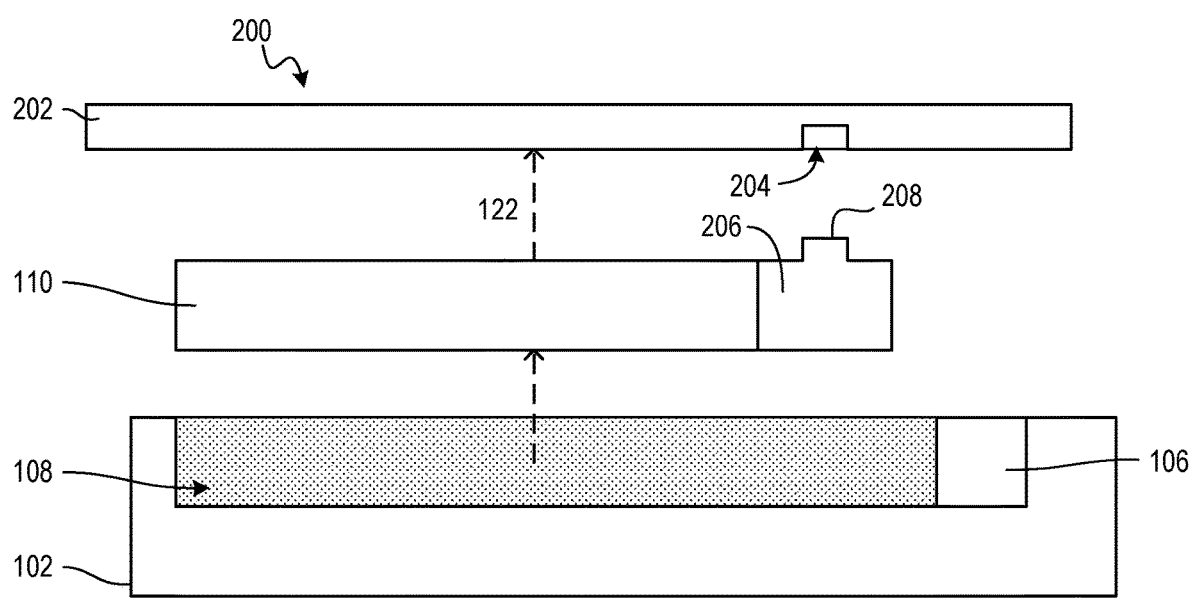
FIG. 2 is a side-view diagram of another example computing device to break an electrical connection with a battery when a cover is moved to disengage from a housing of the computing device, in which the cover is shown opened.

FIG. 2 shows another example computing device 200 to break an electrical connection with a battery when a cover is moved to disengage from a housing of the computing device, showing the cover opened. The computing device 200 is similar to the computing device 100 of FIGS. 1A to 10 and the above description may be referenced for details omitted here.

The computing device 200 includes a cover 202 of a housing with an engageable element in the form of a recess 204. A removable battery 110 includes a battery connector 206 that includes a complementary engageable element in the form of a protrusion 208. The protrusion 208 may be inserted to and removed from the recess 204 along an axis of engagement signified by arrow 122. The protrusion 208 and recess 204, when engaged, allow the battery connector 206 to be moved, for example, along an axis of connection perpendicular to the arrow 122 (or parallel to arrow 120 of FIG. 1B), to make and break an electrical connection between the battery connector 206 and a device connector 106 situated in the housing 102.

Figure 3:
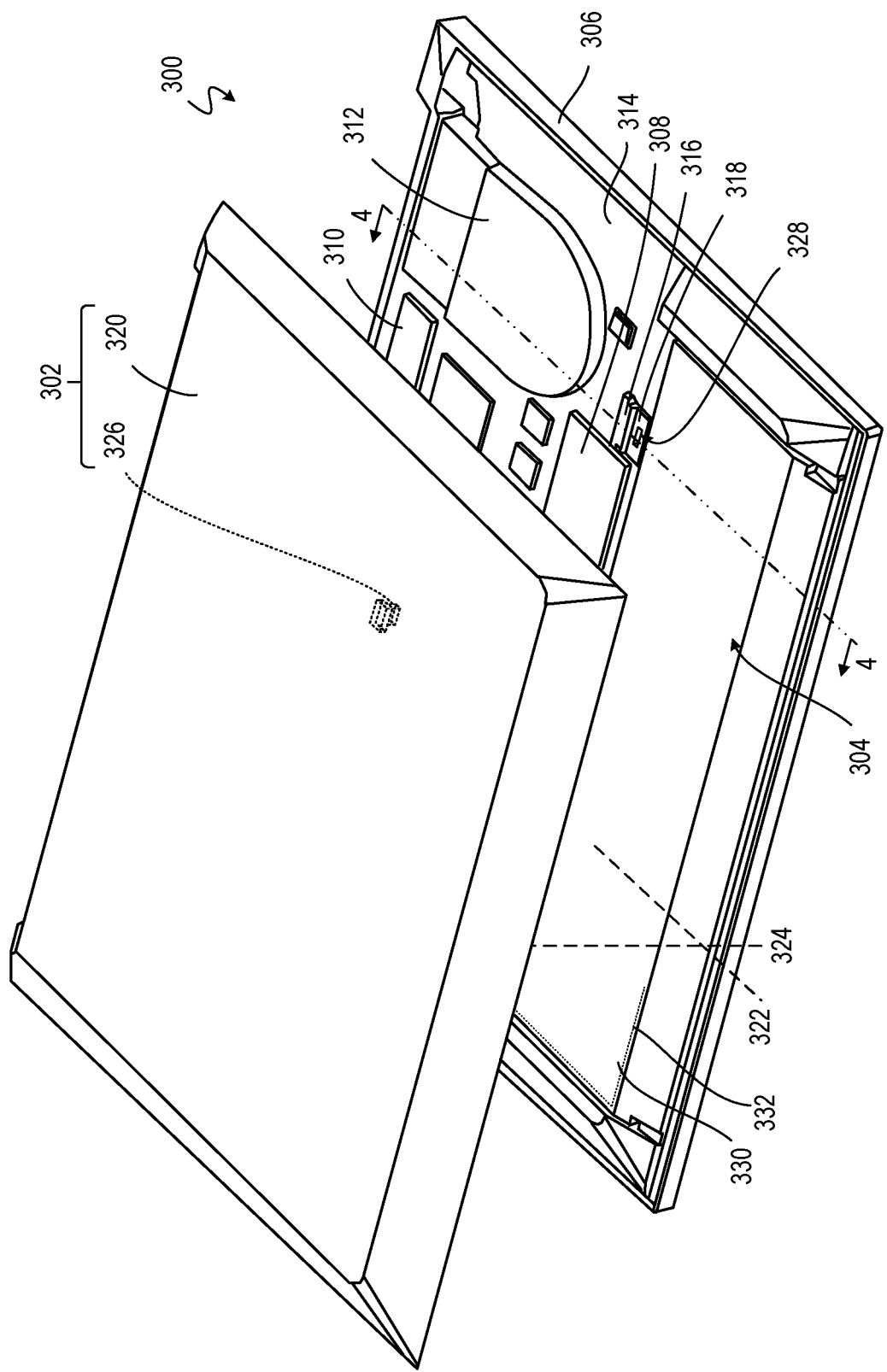
FIG. 3 is a perspective view of another example computing device with an example housing apparatus to break an electrical connection with a battery, in which a cover of the housing apparatus is shown disengaged.

FIG. 3 shows an example computing device 300 with an example housing apparatus 302 to break an electrical connection with a battery 304. The computing device 300 be a notebook computer, tablet computer, smartphone, or other computing device that uses a removable battery as a power source.

The computing device 300 includes a housing 306 that may contain operational components 308-314, such as a processor (e.g., a central processing unit or CPU), memory electrically connected to the processor, a circuit board, a graphics processing unit (GPU), a storage drive, display device, keyboard, and so on. The housing 306 may include a receptable to receive the battery 304 to power the components 308-314.

The computing device 300 further includes a device connector 316 positioned inside the housing 306 at a fixed position relative to the housing 306 The device connector 316 may be mounted to a circuit board 314. The device connector 316 may be electrically connected to the processor, memory, and other components 308-314 of the computing device 300.

The device connector 316 mechanically and electrically mates with a battery connector 318 attached to the battery 304 to communicate power from the battery 304 to the components 308-314.

The housing apparatus 302 includes a panel 320, which may be termed a bottom panel, to engage with the housing 306 of the computing device 300 to close the housing 306 and secure the battery 304 inside the housing 306.

The panel 320 may be slidably secured to the housing 306 along a connection axis 322. Sliding the panel 320 in one direction along the axis 322 may secure the panel 320 to the housing 306. Sliding the panel 320 in the opposite direction along the axis 322 may free the panel 320 from the housing 306. This may be achieved by mating slots and tabs or similar structures.

The panel 320 may joined and withdrawn from the housing 306 along an engagement axis 324, which is non-coincident with the connection axis 322 and may be perpendicular to the connection axis 322.

The housing apparatus 302 includes an engageable element 326 disposed on an inner side of the panel 320. The engageable element 326 engages with a complementary engageable element 328 of the battery connector 318 of the battery 304.

The engageable element 326 at the panel 320 is shaped to engage and disengage with the complementary engageable element 328 of the battery connector 318 when the panel 320 is moved along the engagement axis 324, so that the panel 320 may be joined to and withdrawn from the housing 306.

Further, the engageable element 326 at the panel 320 is shaped to move the battery connector 308 in unison with the panel 320 along the connection axis 322 when the engageable element 326 is engaged with the complementary engageable element 328 of the battery connector 318. This provides automatic disconnection and reconnection of the battery connector 318 with the device connector 316.

In this example, the engageable element 326 at the panel 320 includes a protrusion and the engageable element 328 at the battery connector 318 includes a recess. In other examples, the engageable element 326 at the panel 320 includes a recess and the engageable element 328 at the battery connector 318 includes a protrusion.

The battery 304 and battery connector 318 with its engageable element 328 may be considered a battery device. The battery device may include a battery housing 330 to contain a cell 332, such as an electrochemical cell, and may be shaped to removable fit within the housing 306 computing device 300, as depicted in FIG. 3. The battery connector 318 is electrically connected to the cell 332 to provide power from the cell 332 to the device connector 316. The battery connector 318 may be connected to the cell 332 and battery housing 330 via a flexible cable or similar flexible or moveable element that allows the battery connector 318 to move while the cell 332 and battery housing 330 are stationary. The engageable element 328 of the battery connector 318 may be a protrusion or recess, as discussed above.

Figure 4A:
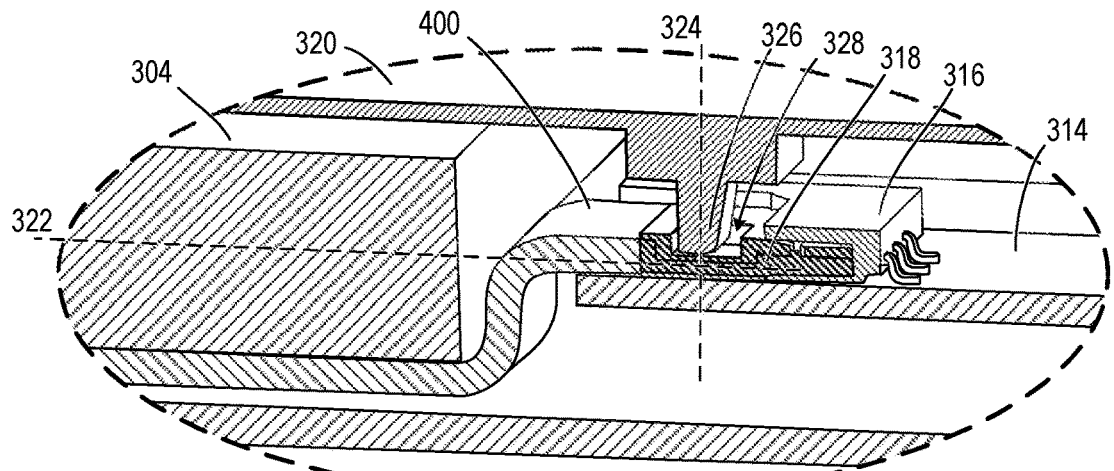
FIG. 4A is a side view of components around the electrical connection of FIG. 3 along section line 4-4, in which the electrical connection is made.
Figure 4B:
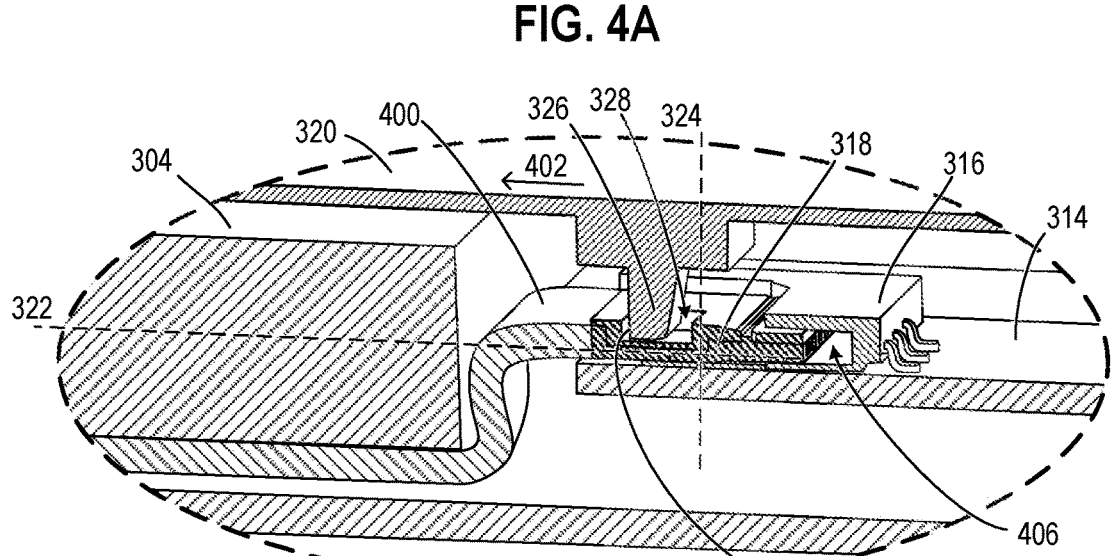
FIG. 4B is a side view of components around the electrical connection of FIG. 3 along section line 4-4, in which the electrical connection is broken.
Figure 4C:
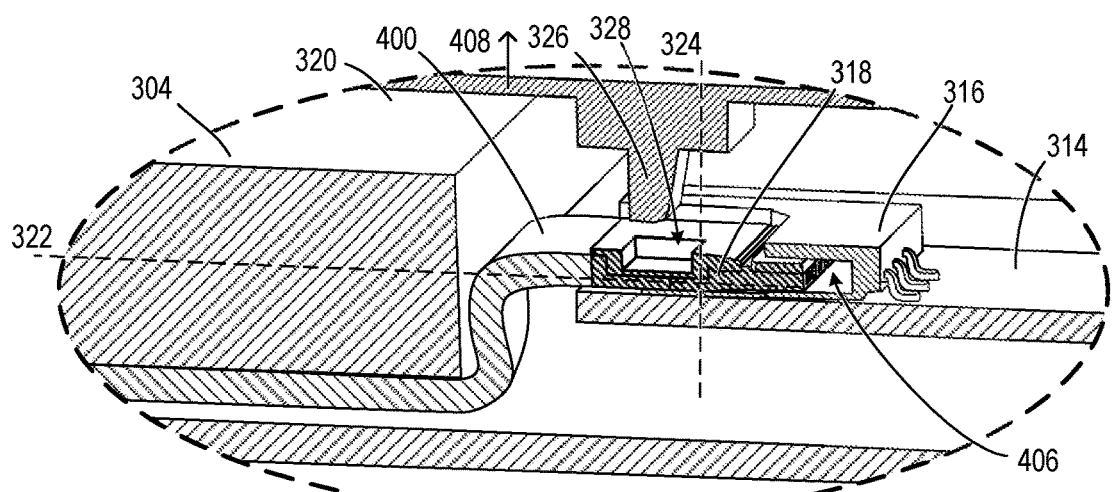
FIG. 4C is a side view of components around the electrical connection of FIG. 3 along section line 4-4, in which the engageable elements are disengaged.

FIGS. 4A-4C are side views of components around the electrical connection of FIG. 3 along section line 4-4. FIG. 4A shows the electrical connection made, FIG. 4B shows the electrical connection is broken, and FIG. 4C shows the engageable elements disengaged. FIGS. 4A-4C also show a flexible cable 400 that electrically and mechanically connects the battery connector 318 to the cell of the battery 304.

The disconnection process is discussed below.

As shown in FIG. 4A, the electrical connection is made by connection of the battery connector 318 to the device connector 316 and the complementary engageable elements 326, 328 are engaged.

As shown in FIG. 4B, the panel 320 is moved in a direction 402 along the axis of connection 322. The engageable element 326 (e.g., the protrusion) of the panel 320 moves in unison with the panel 320 and an outer surface of the engageable element 326 pushes against an inner surface of the engageable element 328 (e.g., the recess) of the battery connector 318, as shown at 404. This causes the battery connector 318 to move along the axis of connection 322 in unison with the panel 320 and thus breaks the connection of the battery connector 318 to the stationary device connector 316, at 406. Note that, as illustrated, the battery connector 318 need not be fully withdrawn from the device connector 316 to break the electrical connection at 406.

As shown in FIG. 4C, the panel 320 may be withdrawn in a direction 408 along the axis of engagement 324 to cause the engageable elements 326, 328 to disengage, e.g., by withdrawing the protrusion from the recess.

The connection process is substantially the opposite of the above disconnection process.

Figure 5:
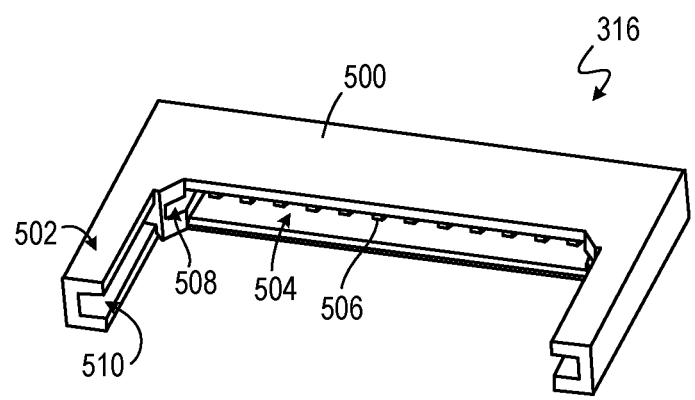
FIG. 5 is a perspective view of the example device connector of FIG. 3.

FIG. 5 shows an example device connector 316, such as that of FIG. 3. The device connector 316 includes a body 500 with opposing arms 502 extending from opposite sides of the body 500. The body 500 has a receptable 504 inside which are an array of electrical contacts 506. The body 500 has opposing inner channels 508 to receive inner ridges 602 of a battery connector 318 (see FIG. 6) to guide contacts of the battery connector 318 into electrical connection with the contacts 506 in the receptable 504. The opposing arms 502 have opposing guide channels 510 to maintain a slidable mechanical connection with the battery connector 318 for a distance when the electrical connection is broken.

Figure 6:
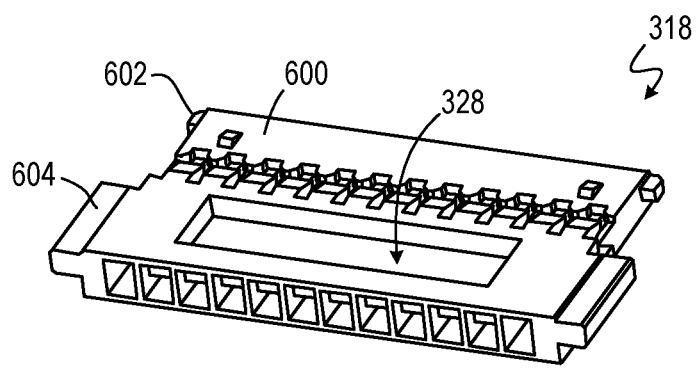
FIG. 6 is a perspective view of the example battery connector of FIG. 3.

FIG. 6 shows an example battery connector 318, such as that of FIG. 3. The battery connector 318 includes a body 600 with an array of electrical contacts (hidden from view). The body 600 has opposing inner ridges 602 to fit within inner channels 508 of a device connector 316 (see FIG. 6) to guide the contacts of the battery connector 318 into electrical connection with the contacts 506 in the receptable 504 of the device connector 316. The body 600 has opposing guide ridges 604 to fit within the guide channels 510 of the opposing arms 502 of the device connector 316 to maintain a slidable mechanical connection with the device connector 316 for a distance when the electrical connection is broken.

The guide ridges 604 and guide channels 510 are sized to provide a sliding mechanical connection that allows the battery connector 318 to be inserted into and removed from the device connector 316 without making the electrical connection. This allows the engageable element 328 (e.g., the recess) of the battery connector 318 to move the battery connector 318 in unison with the cover or panel for a distance to make or break the electrical connection while maintaining the mechanical connection. The guide ridges 604 and guide channels 510 may be engaged prior to making the electrical connection, so that that the engageable element 328 is positioned at the proper location to engage with the complementary engageable element on the cover or panel, which will be moved to make the electrical connection.

Figure 7A:
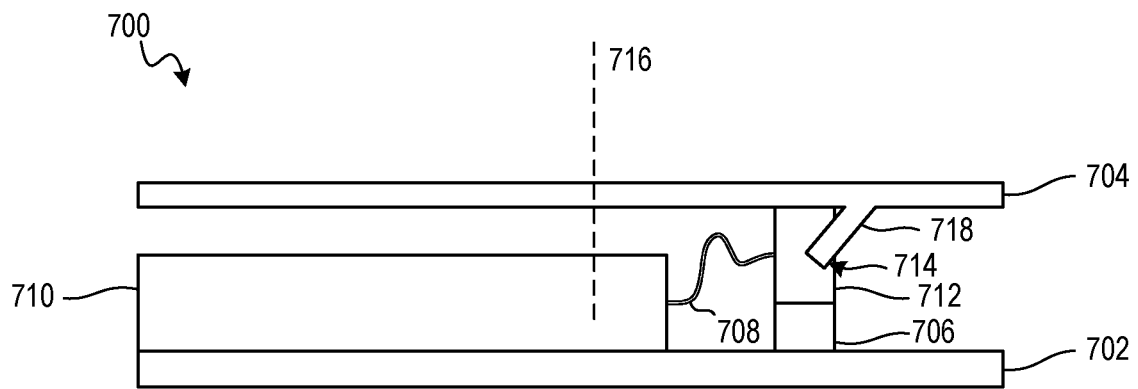
FIG. 7A is a side-view diagram of an example computing device to break an electrical connection with a battery along a connection axis when a cover is moved along the connection axis to disengage from a housing of the computing device, in which the cover is shown engaged.
Figure 7B:
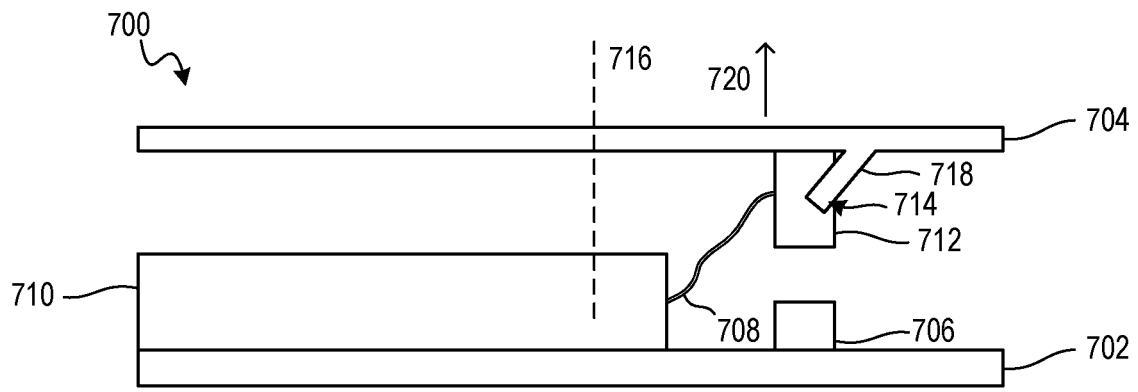
FIG. 7B is a side-view diagram of the example computing device of FIG. 7A showing the breaking the electrical connection with the cover.
Figure 7C:
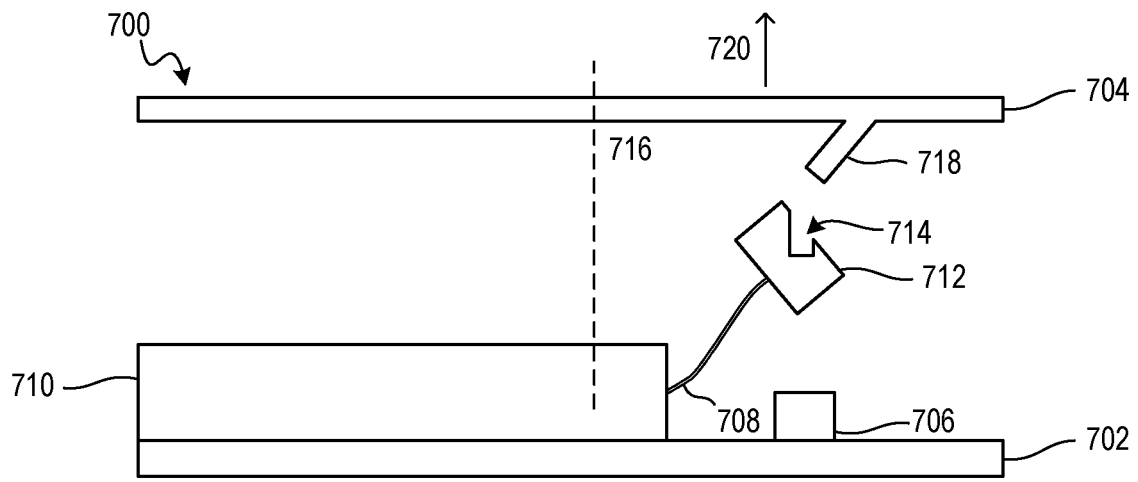
FIG. 7C is a side-view diagram of the example computing device of FIG. 7A showing the cover opened.

FIGS. 7A-7C show an example computing device 700 to break an electrical connection with a battery along a connection axis when a cover is moved along the connection axis to disengage from a housing of the computing device. In FIG. 7A, the cover is shown engaged. FIG. 7B shows the breaking the electrical connection with the cover. FIG. 7C shows the cover opened.

The computing device 700 includes a housing 702, a cover 704, and a device connector 706. The computing device 700 may further include other components, such as a processor, memory, storage drive, display device, network interface, and so on. The description of the other examples discussed herein may be referenced for details not repeated here.

A battery 710 may in installed in the housing 702. The battery 710 includes a battery connector 712 to selectively electrically mate with the device connector 706. The battery connector 712 may be moveable independent of the battery 710 along a connection axis 716. The battery connector 712 may be connected to the battery 710 by a flexible cable 708.

The cover 704 includes an engageable element 718 to engage with a 4 complementary engageable element 714 of the battery connector 712. In this example, the cover engageable element 718 is an angled post the extends into the housing 702, and the battery engageable element 714 is a like-shaped hole or slot.

In this example, the cover 704 is removable from the housing 702 along the connection axis 716 in generally the same direction 720 as the battery connector 712 is disconnected from the device connector 706. As such, the cover 704 may be removed from the housing 702 in the direction 720 to move the battery connector 112 in unison with the cover 104 due to engagement of the engageable elements 718, 714, as shown in FIG. 7B. The battery connector 712 moves with the cover 704 in the same direction 720.

The engageable element 718 of the cover 704 may also disengage from the complementary engageable element 714 of the battery connector 712 to allow separation of the cover 704 and the battery connector 712, as shown in FIG. 7C.

In this example, the angle with respect to the connection axis 716 of the post and hole that form the engageable elements 718, 714 provides for a force to be transferred from the cover 704 to the battery connector 712. The smaller the angle (approaching parallel to axis 716), the smaller the force. The larger the angle (approaching perpendicular to axis 716), the larger the force. The specific angle used in an implementation may be selected to transmit sufficient force to disengage the battery connector 712 from the device connector 706, while allowing the engageable elements 718, 714 to easily disengage, such that a single motion of the cover 704 in direction 720 may unplug the battery connector 712 and separate the battery connector 712 from the cover 704.

The process above may be reversed to connect the battery connector 712 and install the cover 704.

In view of the above, it should be apparent that engageable elements may be provided to battery and device connectors to enforce disconnection of a battery when a computing device is opened for service or other reasons. Accordingly, inadvertent damage to the computing device may be avoided.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
    a housing including a battery compartment to receive a removable battery that includes a battery connector that is removable from the housing;
    a cover engageable with the housing to close the battery compartment; and
    a device connector positioned inside the housing at a fixed position relative to the housing, the device connector to make an electrical connection with the battery connector of the removable battery when the removeable battery is disposed within the battery compartment;
    wherein the cover includes an engageable element to engage a complementary engageable element of the battery connector to move the battery connector to break the electrical connection with the device connector when the cover is moved to disengage from the housing.

2. The computing device of claim 1, wherein the engageable element is further to engage the complementary engageable element of the battery connector to move the battery connector to make the electrical connection with the device connector when the cover is moved to engage to the housing.

3. The computing device of claim 1, wherein the engageable element of the cover includes a protrusion insertable into and removable from a recess that forms the complementary engageable element of the battery connector.

4. The computing device of claim 3, wherein an axis of engagement along which the protrusion is insertable into and removable from the recess is non-coincident with an axis of connection along which the battery connector is movable relative to the device connector to break the electrical connection.

5. The computing device of claim 4, wherein the cover is slidably disengageable from the housing along the axis of connection.

6. The computing device of claim 4, wherein the axis of engagement is perpendicular to the axis of connection.

7. The computing device of claim 1, wherein the engageable element of the cover includes a recess to receive a protrusion that forms the complementary engageable element of the battery connector.

8. The computing device of claim 7, wherein an axis of engagement along which the recess receives the protrusion is non-coincident with an axis of connection along which the battery connector is movable relative to the device connector to break the electrical connection.

9. The computing device of claim 8, wherein the cover is slidably disengageable from the housing along the axis of connection.

10. The computing device of claim 1, wherein the device connector includes a channel to receive and guide a ridge on the battery connector, wherein the channel is to constrain the battery connector to move in unison with the cover when the engageable element and complementary engageable element are engaged.

11. The computing device of claim 1, further comprising:
    a processor contained within the housing; and
    memory contained within the housing and electrically connected to the processor;
    wherein the device connector is electrically connected to the processor and memory.

12. A battery device comprising:
    a housing to fit within a computing device, the housing to contain a cell; and
    a connector electrically connectable to the cell and electrically connectable to a complementary connector of the computing device, the connector including an engageable element to engage with a complementary engageable element of a housing cover of the computing device;
    wherein the engageable element is shaped to move the connector in unison with the housing cover of the computing device along a connection axis when the engageable element is engaged with the complementary engageable element of the housing cover,
    wherein the engageable element of the connector is shaped to disengage with the complementary engageable element of the housing cover when the housing cover is disengaged from the housing.

13. The battery device of claim 12, wherein the engageable element of the connector is shaped to engage and disengage with the complementary engageable element of the housing cover when the housing cover is moved along an axis that is non-coincident with the connection axis.

14. The battery device of claim 12, wherein the engageable element includes a recess.

15. The battery device of claim 12, wherein the engageable element includes a protrusion.

16. The battery device of claim 12, further comprising a flexible cable to electrically and mechanically connect the connector to the cell.

17. A housing apparatus comprising:
- a cover to engage with a housing of a computing device to close the housing to secure a battery inside the housing, the battery including a battery connector, with both the battery and the battery connector being removable from the housing; and
- an engageable element disposed on an inner side of the cover to engage with a complementary engageable element of the battery connector of the battery;
- wherein the engageable element is shaped to move the battery connector in unison with the cover along a connection axis when the engageable element is engaged with the complementary engageable element of the battery connector.

18. The housing apparatus of claim 17, wherein the engageable element of the cover is shaped to engage and disengage with the complementary engageable element of the battery connector when the cover is moved along an axis that is non-coincident with the connection axis.

19. The housing apparatus of claim 17, wherein the engageable element includes a recess.

20. The housing apparatus of claim 17, wherein the engageable element includes a protrusion.

* * * * *